United States Patent [19]

Wang

[11] Patent Number: 4,939,206

[45] Date of Patent: Jul. 3, 1990

[54] FLAME RETARDANT POLYORGANOSILOXANE-BASED GRAFT POLYMERS

[75] Inventor: I-Chung W. Wang, Williamstown, Mass.

[73] Assignee: General Electric Company, Parkersburg, W. Va.

[21] Appl. No.: 271,230

[22] Filed: Nov. 14, 1988

[51] Int. Cl.$^5$ .............................................. C08L 51/08
[52] U.S. Cl. ...................................... 525/63; 525/267;
525/262; 525/403; 524/401; 524/425; 524/430;
524/449; 524/451; 524/456; 524/439
[58] Field of Search ................. 525/63, 267, 262, 403;
524/425, 451, 449, 430, 401, 456, 439

[56] References Cited

U.S. PATENT DOCUMENTS

| | | | |
|---|---|---|---|
| 2,465,319 | 3/1949 | Whinfield et al. | 260/75 |
| 2,550,139 | 4/1951 | Daly | 260/45.5 |
| 2,698,313 | 12/1954 | Daly | 260/45.5 |
| 2,713,566 | 7/1955 | Reid | 260/45.5 |
| 2,820,773 | 1/1958 | Childers et al. | 260/45.5 |
| 2,891,920 | 6/1959 | Hyde et al. | 260/29.2 |
| 2,901,466 | 8/1959 | Kibler et al. | 260/75 |
| 2,908,661 | 10/1959 | Calvert | 260/45.5 |
| 3,047,539 | 7/1962 | Pengilly | 260/75 |
| 3,271,367 | 9/1966 | Schnell et al. | 260/49 |
| 3,306,874 | 2/1967 | Hay | 260/47 |
| 3,306,875 | 2/1967 | Hay | 260/47 |
| 3,737,409 | 6/1973 | Fox | 260/49 |
| 3,898,300 | 8/1975 | Hilliard | 260/827 |
| 4,071,577 | 1/1978 | Falender et al. | 260/827 |
| 4,226,761 | 10/1980 | Cooper et al. | 525/63 |
| 4,556,705 | 12/1985 | McCready | 528/289 |
| 4,579,885 | 4/1986 | Domeier et al. | 528/109 |
| 4,619,968 | 10/1986 | Henton | 525/67 |
| 4,812,515 | 3/1989 | Kress et al. | 525/63 |

FOREIGN PATENT DOCUMENTS

| | | |
|---|---|---|
| 0166900 | 1/1986 | European Pat. Off. |
| 0249964 | 12/1987 | European Pat. Off. |
| 1590549 | 6/1981 | United Kingdom |

OTHER PUBLICATIONS

D. Graiver et al., Rubber Chum. Tech., 56(5), 918 (1983).

*Primary Examiner*—Melvin I. Marquis
*Attorney, Agent, or Firm*—Hedman, Gibson, Costigan & Hoare

[57] ABSTRACT

Thermoplastic resin compositions are blended with a novel silicone-based flame retardant which also imparts good impact resistance and low temperature ductility on the thermoplastic resins. Polyorganosiloxanes are grafted with vinyl-based polymers, such as bromostyrenes, capable of exhibiting flame retarding properties and then blended with normally flammable thermoplastic resins.

44 Claims, No Drawings

FLAME RETARDANT POLYORGANOSILOXANE-BASED GRAFT POLYMERS

CROSS-REFERENCE TO RELATED APPLICATIONS

This application is related to the following commonly owned, concurrently-filed U.S. patent applications:

| SER. NO. | SUBJECT MATTER | APPLICANT(S) |
|---|---|---|
| 07/271,250 | Polyorganosiloxane/ polyvinyl-based Graft Polymers, Process and Thermoplastic Compositions Containing the Same | I-C. W. Wang |
| 07/271,223 | Thermoplastic Molding Compositions Containing Polyorgano-siloxane/polyvinyl-based Graft Polymer Modifiers | J. L. DeRudder F. J. Traver I-C. W. Wang |
| 07/271,222 | Low Gloss Molded Articles Using Polyorganosiloxane/ polyvinyl-based Graft Polymers | J. L. DeRudder H. Savenije I-C. W. Wang |
| 07/271,249 | Polyphenylene ether or Polyphenylene ether/Polystyrene with Polyorgano-siloxane/polyvinyl-based Graft Polymer Modifiers | M. A. Alsamarraie W. R. Haaf W. J. Peascoe I-C. W. Wang |
| 07/271,248 | Polyorganosiloxane/ polyvinyl-based Graft (meth)acrylate Polymers | M. A. Alsamarraie S. Y. Hobbs I-C. W. Wang V. H. Watkins |
| 07/271, 247 | Polyester, Polycarbonate and/or Polyphenylene ether with Polyorgano-siloxane/polyvinyl-based Graft (meth)-acrylate Polymers | M. Alsamarraie S. Y. Hobbs I-C. W. Wang V. H. Watkins |
| 07/271,246 | Polycarbonate and Polyester Blends Modified with Poly-organosiloxane Graft Polymers Combined with Diene Rubber-based Graft Polymers | J. L. DeRudder I-C. W. Wang |
| 07/271,896 | Polyesters Modified with Polyorgano-siloxane/polyvinyl-based Graft Polymers | J. L. DeRudder I. C. W. Wang |

FIELD OF THE INVENTION

This invention relates to a flame retardant composition comprising a multi-stage polyorganosiloxane-based grafted by a vinyl-based polymer capable of exhibiting flame retardant properties. The invention also relates to normally flammable thermoplastic resins comprising an effective amount of the flame retardant composition. More particularly this invention relates to polycarbonate resins with novel polyorganosiloxane/polystyrene-based modifiers grafted by a brominated vinyl-based polymer.

BACKGROUND OF THE INVENTION

In attempts to increase the flame resistance of normally flammable thermoplastic resins, it has been a common practice to blend monomeric phosphites, phosphoric acid esters, thiophosphoric acid esters, containing halogenated organic alkyl radicals and halogenated organic compounds into the carbonate polymer. Increasing flame resistance becomes even more problematic when a rubber component is incorporated into the blends to increase low temperature impact resistance. The rubber modified thermoplastic resins frequently exhibit substantially poorer flame resistance properties than do unmodified thermoplastic resins.

Accordingly, there exists a need for rubber modified thermoplastic resins which exhibit a high resistance to flammability. Such a rubber modified thermoplastic resin would satisfy a long felt need, expanding the possible applications of rubber modified thermoplastic resins and thus constitute a notable advance in the state of the art.

Henton, in U.S. Pat. No. 4,619,968 describes carbonate polymer blends exhibiting flame resistant properties comprising a carbonate polymer grafted rubber compound, such as acrylonitrile/butadiene/styrene, in which at least a portion of the grafted on the rubber backbone is a flame resistant polymer; such as bromostyrene. The composition is claimed to achieve both flame and sharp notch impact resistance. However, the patentee does not teach the use of a silicone-based modifier with vinyl-based polymer grafts capable of exhibiting flame retardant properties.

There have been many attempts in the art to provide polyorganosiloxane-based graft copolymers which may be useful as impact strength modifiers for thermoplastic resins. See, for example, U.S. Pat. No. 2,891,920 (J. F. Hyde, et al.); and O. Graiver, et al., Rubber Chem. Tech., 56 (5), 918 (1983).

U.S. Pat. No. 3,898,300 states that a polyorganosiloxane-based graft copolymer for improving the impact strength of S/AN resin is formed by grafting S/AN co-monomers in an emulsion system onto the vinylsiloxane or allylsiloxane containing silicone substrate. U.S. Pat. No. 4,071,577 describes a similar approach by using a mercaptosiloxane in place of vinyl-group containing siloxanes. European Patent No. 0,166,900 reports further improvement of polysiloxane-based graft polymers and increased S/AN impact strength by using acryloxy-functionalized siloxane as the graft-linking agent. These graft polymers are utilized in connection with the impact modification of S/AN. British Patent No. 1,590,549 describes the use of a polyorganosiloxane graft copolymer in various plastic molding compositions. Similarly, European Patent Application No. 0,249,964 describes the use of a polyorganosiloxane graft copolymer in the polycarbonate containing blends None of the references disclose the in-situ co-homopolymerization of vinyl monomer in the presence of siloxanes in an emulsion system, as described hereinbelow. The present invention is also directed to the use of graft polymers provided by subsequent graft polymerization of vinyl monomers (e.g. polymethyl (meth)acrylate, polystyrene or styrene/acrylonitrile copolymer) in the presence of such a co-homopolymerized polyorganosiloxane/vinyl-based substrate. Furthermore none of the prior art references have been shown to provide flame resistance by grafting onto the organosiloxane-based substrates a vinyl-based polymer capable of exhibiting flame retardant properties.

Unexpectedly, use of vinyl-based polymers capable of exhibiting flame retardant properties in the subsequent stages of the graft polymer, produces a novel flame retardant useful in imparting flame resistant properties on normally flammable thermoplastic resins and concurrently increasing both notched impact resistance and low temperature ductility.

SUMMARY OF THE INVENTION

According to the present invention there are provided flame retardant compositions comprising a multi-stage polyorganosiloxane-based graft polymer composition comprising (a) as a first stage, (i) an organosiloxane polymer with units derived from a cross-linking agent or agents and optionally units which serve as a graft-linking agent or agents; or (ii) a polymeric co-homopolymerized substrate comprised of, in combination, an organosiloxane polymer, a vinyl-based polymer, and optionally units from a cross-linking agent or agents; units which serve as a graft-linking agent or agents units; units derived from a cross-linking agent or agents and graft-linking agent or agents, or a mixture of any of the foregoing units; or a mixture of (i) and (ii); and a functionally effective amount of (b) at least one subsequent stage or stages graft polymerized in the presence of any previous stages the outermost stage being comprised of a vinyl-based polymer, or a linked vinyl-based polymer, capable of exhibiting flame retardant properties.

Preferable vinyl-based polymer components of the first stage substrate (a)(ii) comprise primarily alkenyl aromatic units, (meth)acrylate units or mixtures thereof. Especially preferred is polystyrene.

Vinyl-based polymers capable of exhibiting flame retardant properties useful in any subsequent stage are selected from polymerized alkenyl aromatic compounds, (meth)acrylate compounds, vinyl cyanide compounds, maleimide compounds and acrylamide compounds. Preferably, the vinyl-based polymer capable of exhibiting flame retardant properties comprises polymerized bromostyrene, dibromostyrene, chlorostyrene, dichlorostyrene, or a mixture of any of the foregoing. Especially preferred is polymerized dibromostyrene or a mixture thereof with styrene, styrene and acrylonitrile, styrene and methyl methacrylate, or methyl methacrylate.

In other preferred features the subsequent stage comprise (b)(i) a second stage comprising at least one vinyl-based polymer and optionally units derived from a cross-linking agent or agents, units which serve as a graft-linking agent or agents, units derived from a cross-linking agent or agents and units from the same agent or agents which serve as a graft-linking agent or agents, or a mixture of any of the foregoing; and (b)(ii), a third stage comprising at least one vinyl-based polymer or cross-linked vinyl-based polymer capable of exhibiting flame retardant properties which is the same as, or different than the (b)(i) polymer. Preferably the ratio of first stage substrate (a) to second stage polymer (b)(i) is 10:90 to 90:10 and the amount of third stage polymer (b)(ii) comprises from about 10 to about 90 parts by weight per 100 parts by weight of (a), (b)(i), and (b)(ii) combined. Especially preferred is a subsequent stage having a second stage comprising a cross-linked butyl acrylate polymer and a third stage comprising a dibromostyrene/styrene/acrylonitrile terpolymer.

According to other preferred embodiments, the invention provides normally flammable thermoplastic resins having an effective flame retarding amount of a multi-stage polyorganosiloxane-based graft polymer as described above.

The preferred normally flammable thermoplastic resins comprise a polyvinylic resin, a polyester resin, a polyamide resin, a polycarbonate resin, a polyacetal resin, a polyether resin, poly(etherester) resin, a poly(etherimide) resin, a poly(etherimide ester) resin, interpolymers comprising units of any of the foregoing resins and compositions comprising blends of any of them. Especially preferred is poly(bisphenol-A carbonate).

Also contemplated by this invention are compositions comprising an effective amount of a reinforcing filler, and/or an effective amount of a flame retardant agent(s) in addition to the multi-stage polyorganosiloxane-based graft polymer flame retardant described above. In another embodiment of the present invention there are also provided molded, extruded and/or thermoformed articles made from such compositions.

DETAILED DESCRIPTION OF THE INVENTION

The flame retardant agent comprises a multi-stage polyorganosiloxane-based graft polymer composition. Preferably the preparation of the flame retardant agent is begun by employing a co-homopolymerization process.

Co-homopolymerization refers to a polymerization step where two distinct polymerization mechanisms are effected concurrently, including simultaneously. In particular, the first stage co-homopolymerization may encompass a siloxane polymerization (e.g., ring opening and condensation mechanism) in conjunction with a concurrent vinyl polymerization. The discrete mechanisms are not seen as competing with each other, but rather, two homopolymers are concurrently produced each retaining its own structure.

The co-homopolymerization process may provide two discrete networks rather than a random copolymer. While not intending to be bound by any theory, it is possible that the network(s) comprises two or more distinct interpenetrating polymer phases, which provides the additional strength needed in the polyorganosiloxane phase. This is evidenced by the two distinct glass transition temperatures which can be detected by differential scanning calorimetry. Preferably, the product of the co-homopolymerization process is rubbery instead of a resin-like powder.

Subsequent to the co-homopolymerization of the siloxanes and vinyl-based monomers of the first step, at least one additional graft polymerization process is utilized to achieve the multi-stage polyorganosiloxane/polyvinyl-based graft polymers of the present invention.

The subsequent graft polymerization is preferably of at least one vinyl type monomer. It has been found that a styrene/acrylonitrile copolymer or an alkyl(meth)acrylate polymer is particularly effective as the second stage graft polymer or copolymer, or as the outermost stage when intermediary stages are optionally utilized.

The foregoing polyorganosiloxane/polyvinyl-based graft polymer can be isolated and utilized as a flame retarding agent for thermoplastic resins as will be discussed in detail below.

Additional cross-linking and/or graft-linking agent(s) can be utilized in this initial stage to provide co-homopolymerized networks from both polymeric constituents which provide greater rubber integrity.

The first stage rubbery substrate is provided by a series of sequential processing steps. In a premixing step, the ingredients required for the co-homopolymerization of the organosiloxane(s) and optional vinyl-based monomer(s) are premixed with water and suitable cross-linker(s), graft-linker(s), initiator(s) and surfactant(s). The premixed ingredients are homogenized by conventional means. The co-homopolymerization reactions may begin at this early stage of the process but these reactions are generally slow at room temperature. The homogenized reactants may be directed to a reactor vessel, typically stainless steel or glass flasks, under a nitrogen blanket. Heat is applied to facilitate the reaction. For typical 5 to 50 gallon stainless steel reactors, a 3 to 6 hour residence time at 75 to 90 degrees centigrade is adequate to complete the co-homopolymerization. Cooling for 2 to 6 hours will typically reduce the temperature to at least room temperature where the reaction mass can be held for 3 to 72 hours. Cooling to lower temperatures (e.g. 5 degrees centigrade) may sometimes be preferred since this may enhance the properties of the formed polyorganosiloxane/polyvinyl-based substrate.

Cooling to room temperature or lower allows the polyorganosiloxane portion to build molecular weight, thereby minimizing the extractable silicone rubber fragments and optimizing physical properties of the product for certain applications. Generally, lower temperatures are preferred when it is desired to optimize the elasticity of the formed polyorganosiloxane/polyvinyl-based substrate.

The initiator for the siloxane component of the co-homopolymerization can be any ionic ring opening type initiator when cyclic siloxanes are utilized, such as alkylarylsulfonic acid, alkyldiaryldisulfonic acid, alkylsulfonic acid, or the like. The best suited example is dodecylbenzenesulfonic acid which can act as an initiator and at the same time as an emulsifier. In some cases, the joint use of a metal salt of an aforementioned sulfonic acid is also preferred.

The initiator for the styrenic or other vinyl-based monomers in the co-homopolymerization process can be any organic soluble radical initiator, such as azobisisobutyronitrile (AIBN) and the organic peroxides, e.g. benzoyl peroxide, dichlorobenzoyl peroxide, and tert-butyl perbenzoate. Also suitable are water-soluble radical initiators such as the persulfates. Although it is possible to charge this type of initiator at the beginning of the process, it is preferred that it be charged continuously or incrementally during the co-homopolymerization period. Since persulfate is less stable in the acid conditions of the siloxane polymerization, it is preferred that the persulfate be added over time to keep the vinyl polymerization running. Particle size, pH and total solids measurements can be readily monitored at this stage of the process. A latex rubber emulsion prepared as described above will generally contain particles having an average diameter of 100 to 500 nanometers and preferably 150 to 800 nanometers. The particle size is particularly influenced by the homogenization pressure (and the number of passes through the homogenizer) and the composition of the reaction ingredients. A pressure range of 2000 to 12000 psi is typical and 3000 to 9000 psi is preferred. Multiple passes through the homogenizer may be preferred, but on a large scale a single pass may be most practical.

The foregoing reaction steps must be followed by a suitable neutralization process to provide the products of the invention. The main object of the neutralization is to quench the siloxane polymerization. This is accomplished by adding a caustic solution such as sodium hydroxide, potassium hydroxide, potassium or sodium carbonate, sodium hydrogen carbonate, triethanolamine or triethylamine. The pH of the reaction solution may be raised from a level of 1 to 3 to a pH of at least about 6.5 and preferably 7.0 to 9.

It is often desirable to add additional soap or surfactant to the emulsion formed at the end of the first stage, prior to the neutralization step. Additional surfactant tends to facilitate avoidance of premature agglomeration or flocculation of the co-homopolymerized rubber in the quench step.

The foregoing co-homopolymerization process provides a rubbery network composed of a polyorganosiloxane/polyvinyl-based substrate. This substrate is the first stage of the graft polymer of the present invention. Optionally a first stage comprising an organosiloxane polymer, units which serve as a graft-linking agent or agents and/or units derived from a cross-linking agent or agents may be employed, or a mixture of the co-homopolymerized substrate therewith. The organosiloxane polymer can be prepared in a manner according to the prior art, e.g. EPO No. 0,166,900.

The next stage involves the graft polymerization of additional vinyl-functional moieties capable of exhibiting flame retardant properties onto graft sites provided by the rubbery substrate particles in the latex formed in the first stage.

The grafted polymers will preferably be the product of a vinyl polymerization process. Suitable vinyl monomers for graft polymerization include without limitation, brominated or chlorinated: alkenyl aromatic compounds such as styrene, divinylbenzene, alpha-methylstyrene, vinyl toluene, halogenated styrene and the like; methacrylates such as methyl methacrylate and 2-ethylhexyl methacrylate; acrylates such as acrylic acids, methyl acrylate, ethyl acrylate and butyl acylate; vinyl cyanide compounds such as acrylonitrile and methacrylonitrile; olefins such as ethylene, propylene, butadiene, isoprene, and chloroprene; and other vinyl compounds such as acrylamides, N-(mono or disubstituted alkyl)acrylamides, vinyl acetate, vinyl chloride, vinyl alkyl ethers, allyl(meth)acrylate, triallyl isocyannurate, ethylene dimethylacrylate, diallyl maleate, maleic anhydride; and maleimide compounds such as maleimide, and N-phenyl(or alkyl) maleimide and mixtures of these monomers. Preferred monomers are bromostyrene, dibromostyrene, chlorostyrene, dichlorostyrene, or mixtures of any of them, or a mixture thereof with any vinyl monomers.

The vinyl polymerization is accomplished in an emulsion; therefore, water-soluble initiators are suitable, e.g. potassium persulfate, sodium persulfate and ammonium persulfate. It is practical to add the initiator at the beginning of this step, prior to charging the vinyl monomer for the second stage polymerization. Other Redox initiator systems, such as cumene hydroperoxide/ferrous sulfate/glucose/sodium pyrophosphate, can also be utilized at this stage as well as other organic peroxides.

Sequential multi-stage polymerization processes of this type are sometimes referred to as core-shell processes. It is preferred; however, to describe them as multi-stage graft polymerization processes wherein the initial stage provides a co-homopolymerized organosiloxane/polyvinyl-based substrate. This substrate may have sufficient graft sites for a second or subsequent stage to be grafted thereto. Grafted brominated polystyrene or brominated styrene/acrylonitrile copolymer as the outermost shell is preferred, yet many other intermediary stages, such as a butyl acrylate stage, are also contemplated. Furthermore, the grafting of additional stages of the same or different kinds is also possible.

In general, the first stage comprising the co-homopolymerized polyorganosiloxane/polyvinyl-based substrate will comprise approximately 5 to 95 weight percent of the total graft polymer based upon the weight of the first stage and the subsequent stage or stages taken together. Preferably the first stage will comprise approximately 30 to 90 weight percent on the same basis. Correspondingly, the subsequent stages, comprising the additional grafted vinyl polymers will comprise approximately 95 to 5 weight percent and preferably approximately 70 to 10 weight percent on the same basis. In the multi-stage systems, preferably, the ratio of first stage substrate polymer (a) to second stage polymer (b)(i) is 10:90 to 90:10 and the amount of third stage polymer (b)(ii) comprises from about 10 to about 90 parts by weight per 100 parts by weight of (a), (b)(i) and (b)(ii) combined.

The organosiloxanes useful in the first stage co-homopolymerization are any of those known to produce silicone elastomers and may include those which are hydroxy-, vinyl-, hydride- or mercapto-end capped linear organosiloxane oligomers.

The polyorganosiloxanes illustratively will be comprised primarily of units of the formula $$R_nSiO_{(4-n)/2}$$

wherein R is hydrogen or a monovalent hydrocarbon radical of about 1 to 16 carbon atoms and n is 0, 1 or 2.

Preferred among the organosiloxanes are those in cyclic form having three or more siloxane units and most preferred are those having three to six units. Such organosiloxanes include without limitation, for example, hexamethylcyclotrisiloxane, octamethylcyclotetrasiloxane, decamethylcyclopentasiloxane, dodecamethylcyclohexasiloxane, trimethyltriphenylcyclotrisiloxane, tetramethyltetraphenylcyclotetrasiloxane, tetramethyltetravinylcyclotetrasiloxane and octaphenylcyclotetrasiloxane. These or other similar organosiloxanes may be used alone or in combination.

The vinyl-based monomers useful in conjunction with the co-homopolymerization of organosiloxanes in the first stage are preferred to be alkenyl aromatic compounds such as styrene, divinylbenzene, alpha-methylstyrene, vinyltoluene, vinylnaphthalene, vinylanthracene and halogenated styrene or its derivatives. Other suitable vinyl monomers include acrylic acids and acrylates such as methyl-, ethyl-, allyl-, or butylacrylate; methacrylates such as methyl methacrylate, or 2-ethylhexyl methacrylate; vinyl cyanides such as acrylonitrile and methacrylonitrile; olefins such as ethylene, propylene, butadiene, isoprene, chloroprene; and other vinyl compounds such as vinyl imidazole, 5-vinyl-2-norbornene, vinyl pyrrolidone, vinyl acetate, vinyl acetate, vinyl alkyl ethers, vinyl chloride, vinyl furan, N-vinyl carbazole, allyl (meth)acrylate, triallyl isocyannurate, ethylene di(meth)acrylate, butylene di(meth)acrylate, diallyl maleate, maleic anhydride; maleimide compounds such as maleimide, N-phenyl (or alkyl)maleimides; acrylamides, N-(mono or disubstituted) acrylamides and mixtures of any of these monomers. In general, any rubbery or glassy vinyl type monomer may be used which can be mixable with the organosiloxane. Typically the vinyl component of the first stage co-homopolymer will be present in an amount of approximately 3 to 97 weight percent and correspondingly the polyorganosiloxane component will be present in an amount of approximately 97 to 3 weight percent. Preferably the vinyl component will comprise approximately 5 to 45 weight percent the first stage of the co-homopolymerized substrate.

The cross-linker composition used in conjunction with the organosiloxane component of the present compositions can have the general formula:

$$R^2{}_n-Si(OR^1)_{4-n}$$

wherein n is 0, 1, or 2, preferably 0 or 1 and each $R^1$ independently represents hydrogen or a monovalent hydrocarbon radical selected from among alkyl or aryl radicals having 1 to 16 carbon atoms, preferably methyl, ethyl and phenyl. $R^2$ can be the same as $R^1$ or can be a vinyl, alkenyl, thio or (meth)acryloxyalkyl functional radical. When $R^1$ is a vinyl, alkenyl, thio or acryloxyalkyl radical and the n is 1, the cross-linker compound can also act as a graft-linker.

A preferred cross-linker compound is tetraethoxysilane. A combination cross-linking and graft-linking compound is vinyltriethoxysilane. Another suitable choice is gamma-methacryloxypropyltrimethoxysilane.

The multi-stage polyorganosiloxane/polyvinyl-based graft product of the present invention can be isolated by conventional means such as hot solution coagulation. For example, an electrolytic solution of about 0.5 to 5 percent aluminum sulfate or magnesium sulfate in water can be prepared and heated to about 75° to 95° C. When the latex is added, with agitation, the graft product will precipitate and can be held at an elevated temperature for about 10 minutes whereupon it may be filter washed. Commercial latex isolation techniques such as spray dryers may also be utilized.

The isolated multi-stage graft polymer is also useful as an impact modifier for thermoplastic resins. Compounding impact strength improving amounts of the modifier together with a thermoplastic resin, such as polycarbonate, can be accomplished by conventional means such as a single or twin screw extruder. Typically 1 to 60 parts by weight of the silicone-based modifier can be incorporated in 100 parts of the thermoplastic resin.

With respect to suitable thermoplastic resins (A), this can comprise an aromatic polycarbonate resin, which can be made by those skilled in this art or can be obtained from a variety of commercial sources. They may be prepared by reacting a dihydric phenyl with a carbonate precursor, such as phosgene, a haloformate or a carbonate ester. Typically, they will have recurring structural units of the formula:

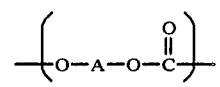

wherein A is a divalent aromatic radical of the dihydric phenyl employed in the polymer producing reaction. Preferably, the aromatic carbonate polymers have an intrinsic viscosity ranging from 0.30 to 1.0 dl/g (measured in methylene chloride at 25° C.). By dihydric phenyls is meant mononuclear or polynuclear aromatic compounds containing two hydroxy radicals, each of which is attached to a carbon atom of an aromatic nucleus. Typical dihydric phenyls include 2,2-bis-(4-hydroxyphenyl)propane; 2,2-bis-(3,5-dimethyl-4-hydroxyphenyl)propane; 4,4'-di-hydroxydiphenyl ether; bis(2-hydroxyphenyl)methane, mixtures thereof and the like. The preferred aromatic carbonate polymer for component (A) is a homopolymer derived from 2,2-bis-(4-hydroxyphenyl)-propane(bisphenol-A).

Poly(ester carbonates) for use in the invention are known and can be obtained commercially. Generally, they are copolyesters comprising recurring carbonate groups:

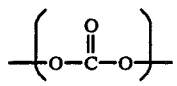

carboxylate groups

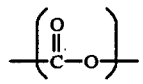

and aromatic carbocyclic groups in the linear polymer chain, in which at least some of the carboxylate groups and at least some of the carbonate groups are bonded directly to ring carbon atoms of the aromatic carbocyclic groups. These poly(ester carbonate) copolymers, in general, are prepared by reacting a difunctional carboxylic acid, such as phthalic acid, isophthalic acid, terephthalic acid, homophthalic acid, o-, m-, and p-phenylenediacetic acid, the polynuclear aromatic acids, such as diphenic acid, 1,4-naphthalic acid, mixtures of any of the foregoing, and the like, with a dihydric phenyl and a carbonate precursor, of the types described above. A particularly useful polyester carbonate is derived from bisphenol-A, isophthalic acid, terephthalic acid, or a mixture of isophthalic acid and terephthalic acid, or the reactive derivatives of these acids such as terephthaloyl dichloride, isophthaloyl dichloride, or a mixture thereof, and phosgene. The molar proportions of dihydroxydiaryl units to benzenedicarboxylate units to carbonate units can range from 1:0.30–0.80:0.70–0.20 and the molar range of terephthalate units to isophthalate units can range from 9:1 to 2:8 in this preferred family of resins.

The aromatic dihydric phenyl sulfone poylmer resins used in component (A) are a family of resins which can be made by those skilled in this art. For example homopolymers of dihydric phenol, and a dihydroxydiphenyl sulfone and a carbonate precursor can be prepared as well as copolymers of a dihydric phenol and a carbonate precursor can be made according to the description in Schnell, et al., U.S. Pat. No. 3,271,367. A preferred material is made by polymerizing bis-(3,5-dimethyl-4-hydroxyphenyl)sulfone, alone, or especially in combination with bisphenol-A with phosgene or a phosgene precursor, in accordance with the description in Fox, U.S. Pat. No. 3,737,409. Especially preferred is a copolymer made by reacting 40 to 99 weight percent of the sulfone, 1 to 60 weight percent of the bisphenol with phosgene.

Polyesters suitable for use in component (A) are derived from an aliphatic or cycloaliphatic diol, or mixtures thereof, containing from 2 to about 10 carbon atoms and at least one aromatic dicarboxylic acid. Preferred polyesters are derived from an aliphatic diol and an aromatic dicarboxylic acid have repeated units of the following general formula:

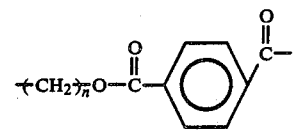

wherein n is an integer of from 2 to 4. The most preferred polyester is poly(ethylene terephthalate).

Also contemplated herein are the above polyesters with minor amounts, e.g., from 0.5 to about 2 percent by weight, of units derived from aliphatic acid and/or aliphatic polyols, to form copolyesters. The aliphatic polyols include glycols, such as poly(ethylene glycol). All such polyesters can be made following the teachings of, for example, U.S. Pat. Nos. 2,465,319 and 3,047,539.

The polyesters which are derived from a cycloaliphatic diol and an aromatic dicarboxylic acid are prepared, for example, by condensing either the cis- or trans-isomer (or mixtures thereof) of, for example, 1,4-cyclohexanedimethanol with an aromatic dicarboxylic acid so as to produce a polyester having recurring units of the following formula

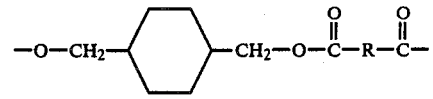

wherein the cyclohexane ring is selected from the cis- and trans-isomers thereof and R represents an aryl radical containing 6 to 20 carbon atoms and which is the decarboxylated residue derived from an aromatic dicarboxylic acid.

Examples of aromatic dicarboxylic acids represented by the decarboxylated residue R are isophthalic or terephthalic acid, 1,2-di(p-carboxyphenyl)ethane, 4,4'-dicarboxydiphenyl ether, etc., and mixtures of these. All of these acids contain at least one aromatic nucleus. Acids containing fused rings can also be present, such as in 1,4- or 1,5-naphthalenedicarboxylic acids. The preferred dicarboxylic acids are terephthalic acid or a mixture of terephthalic and isophthalic acids.

Another preferred polyester may be derived from the reaction of either the cis- or trans-isomer (or a mixture thereof) of 1,4-cyclohexanedimethanol with a mixture of isophthalic and terephthalic acids. Such a polyester would have repeating units of the formula:

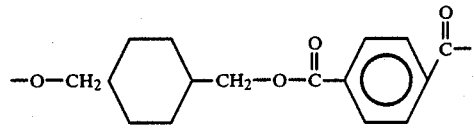

Still another preferred polyester is a copolyester derived from a cyclohexanedimethanol, an alkylene glycol and an aromatic dicarboxylic acid. These copolyesters are prepared by condensing either the cis- or trans-isomer (or mixtures thereof) of, for example, 1,4-cyclohexanedimethanol and an alkylene glycol with an aromatic dicarboxylic acid so as to produce a copolyester having units of the following formula:

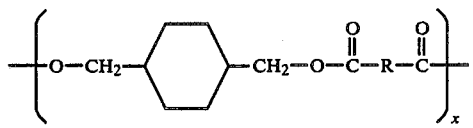

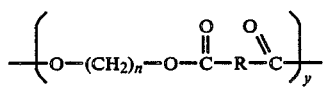

wherein the cyclohexane ring is selected from the cis- and trans-isomers thereof, R is as previously defined, n is an integer of 2 to 4, the x units comprise from about 10 to about 90 percent by weight and the y units comprise from about 90 to about 10 percent by weight.

Such a preferred copolyester may be derived from the reaction of either the cis- or trans-isomer (or mixtures thereof) of 1,4-cyclohexanedimethanol and ethylene glycol with terephthalic acid in a molar ratio of 1:2:3. These copolyesters have repeating units of the following formula:

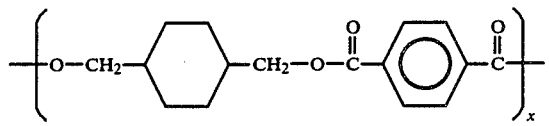

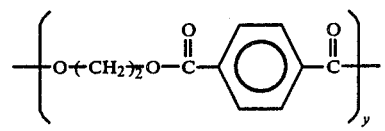

wherein x and y are as previously defined.

The polyesters described herein are either comercially available or can be produced by methods well known in the art, such as those set forth in, for example, U.S. Pat. No. 2,901,466.

The polyesters used herein have an intrinsic viscosity of from about 0.4 to about 2.0 dl/g as measured in a 60:40 phenol:tetrachloroethane mixture or similar solvent at 23°-30° C.

Vinyl aromatic polymer resins useful as component (A) are in general those having at least 25% of their units derived from a monomer having the formula

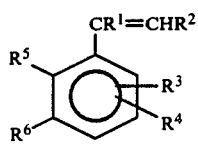

wherein $R^1$ and $R^2$ are selected from the group consisting of lower alkyl or alkenyl groups of from 1 to 6 carbon atoms and hydrogen; $R^3$ and $R^4$ are selected from the group consisting of chloro, bromo, hydrogen and lower alkyl of from 1 to 6 carbon atoms; $R^5$ and $R^6$ are selected from the group consisting of hydrogen and lower alkyl and alkenyl groups of from 1 to 6 carbons or $R^5$ and $R^6$ may be concatenated together with hydrocarbyl groups to form a naphthyl group.

Materials that may be copolymerized with the units of the vinyl aromatic monomer include those having the general formula:

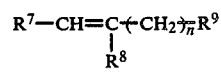

wherein $R^7$ and $R^8$ represent a substituent selected from the group consisting of hydrogen, halogen, an alkyl group of 1 to 4 carbon atoms, carboalkoxy or $R^7$ and $R^8$ taken together represent an anhydride linkage (-COOOC-) and $R^9$ is hydrogen, vinyl, an alkyl or alkenyl group having 1 to 12 carbon atoms, cycloalkyl, carboalkoxy, alkoxy-alkyl, alkyl carboxyl, ketoxy, halogen, carboxy, cyano or pyridyl and n is 0 or a whole number between 1 and 9.

The general formula set forth includes by way of example, homopolymers such as polystyrene and polymonochlorostyrene, the modified polystyrenes, such as rubber-modified, high-impact polystyrene and the styrene containing copolymers such as the styrene/acrylonitrile copolymers, styrene/butadiene copolymers, styrene/acrylonitrile/alpha-alkyl styrene copolymers, styrene/acrylonitrile/butadiene copolymers, poly(alpha-methylstyrene), copolymers of ethylvinylbenzene and divinylbenzene, styrene/maleic anhydride copolymers and styrene/butadiene block copolymers.

The rubber modified high impact polystyrenes may be made with diene rubbers such as butadiene rubber, styrene/butadiene rubber, acrylonitrile rubber or ethylene/propylene copolymers or EPDM rubber.

The ABS copolymers are well known and many suitable types are commercially available. Either an acrylonitrile/butadiene/styrene or an acrylonitrile/butadiene/alpha-methyl styrene may be used as the ABS component. A useful method for preparing these copolymers comprises grafting 73 parts styrene and 42 parts acrylonitrile onto a polybutadiene latex containing 58 parts polybutadiene in the presence of 3 parts soap, 1.7 parts mercaptan and 0.4 parts potassium peroxydisulfate at 50° C. The latex is coagulated and the product is then milled for 10 minutes at 320° F. Other useful methods for preparing these copolymers may be found in U.S. Pat. Nos. 2,550,349; 2,550,139; 2,698,313; U.K. Pat. No. 698,385; U.S. Pat. Nos. 2,713,566; 2,820,773; and 2,908,661, all of which are hereby incorporated by reference.

Polyethers which can be used as component (A) are polyarylene ethers amongst which polyphenylene ethers deserve particular mention. The polyphenylene ethers suitable for use in the present invention are described in numerous publications including Hay, U.S. Pat. Nos. 3,306,874 and 3,306,875 and generally comprise a plurality of structural units having the formula

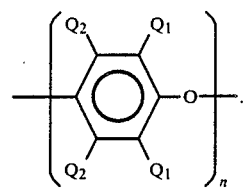

In each of said units independently, each $Q_1$ is independently halogen, primary or secondary lower alkyl (i.e., alkyl containing up to 7 carbon atoms), phenyl, haloalkyl, aminoalkyl, hydrocarbonoxy, or halohydrocarbonoxy wherein at least two carbon atoms separate the halogen and oxygen atoms; and each $Q_2$ is independently hydrogen, halogen, primary or secondary lower alkyl, phenyl, haloalkyl, hydrocarbonoxy or halohydrocarbonoxy as defined for $Q_1$. Examples of suitable primary lower alkyl groups are methyl, ethyl, n-propyl, n-butyl, isobutyl, n-amyl, isoamyl, 2-methylbutyl, n-hexyl, 2,3-dimethylbutyl, 2-, 3- or 4-methylpentyl and the corresponding heptyl groups. Examples of secondary lower alkyl groups are isopropyl, sec-butyl and 3-pentyl. Preferably, any alkyl radicals are straight chain rather than branched. Most often, each $Q_1$ is alkyl or phenyl, especially $C_{1-4}$ alkyl, and each $Q_2$ is hydrogen. Suitable polyphenylene ethers are disclosed in a large number of patents. The integer n is at least 50.

Both homopolymer and copolymer polyphenylene ethers are included. Suitable homopolymers are those containing, for example, 2,6-dimethyl-1,4-phenylene ether units. Suitable copolymers include random copolymers containing such units in combination with (for example) 2,3,6-trimethyl-1,4-phenylene ether units. Many suitable random copolymers, as well as homopolymers, are disclosed in the patent literature.

Also included are the coupled polyphenylene ethers in which the coupling agent is reacted in known manner with the hydroxy groups of two polyphenylene ether chains to produce a higher molecular weight polymer containing the reaction product of the hydroxy groups and the coupling agent. Illustrative coupling agents are low molecular weight polycarbonates, quinones, heterocycles and formals.

The polyphenylene ether generally has a number average molecular weight within the range of about 3,000 to 40,000 and a weight average molecular weight within the range of about 20,000–80,000, as determined by gel permeation chromatography. Its intrinsic viscosity is most often in the range of about 0.35–0.6 dl/g, as measured in chloroform at 25° C.

The polyphenylene ethers are typically prepared by the oxidative coupling of at least one corresponding monohydroxyaromatic compound. Particularly useful and readily available monohydroxyaromatic compounds are 2,6-xylenol (wherein each $Q_1$ is methyl and each $Q_2$ is hydrogen), whereupon the polymer may be characterized as a poly(2,6-dimethyl-1,4-phenylene ether), and 2,3,6-trimethylphenyl (wherein each $Q_1$ and one $Q_2$ is methyl and the other $Q_2$ is hydrogen).

Also contemplated by the present invention are polyether resins in combination with other resins. These include poly(etherester) resins, poly(etherimide) resins and poly(etherimide ester) resins. See, for example, U.S. Pat. Nos. 4,556,705; 4,579,885 and 3,907,926.

Polyacetals are also useful as a thermoplastic resin (A) in the present invention. Acetal polymers are characterized by a —$CH_2O$— repeating unit as their backbone. Preferred polyacetals are polyoxyalkylenes, for example, polyoxymethylene. Also suitable are polyoxymethylene copolymers and terpolymers with oxyethylene and/or oxytrimethylene as co- or termonomers.

Polyamides are characterized as containing a recurring amide group in the chain, —CONH—. Especially preferred polyamides are the nylons. Examples of suitable nylons are linear polycondensates of lactams of 6 to 12 carbon atoms and conventional polycondensates of diamines and dicarboxylic acids. Nylons are identified by numerals indicating the number of carbon atoms in first, the diamine, and second, the diacid. Thus, poly(hexamethylene adipamide) is identified as nylon-6,6. In the case of nylons made from monomers containing both reacting species or from lactams, a single number is used to identify the polymer. Thus polycaprolactam is nylon-6 and poly(11-amino-undecanoic acid) is nylon-11. Other examples are nylon-6,8; nylon-6,9; nylon-6,10; nylon-6,12; nylon-8,8; nylon-12,12 and nylon-12. The nylons preferably have a relative viscosity of from about 2.30 to about 3.60, measured at 1 percent strength in concentrated sulfuric acid at 25° C.

The amounts of compounds (A) and (B) can vary broadly, but will usually be in the range of from about 1 to about 99 parts by weight of (A) to from about 99 to about 1 part by weight of (B), per 100 parts by weight of (A) and (B) together. Preferably (A) comprises from about 99 to about 30 parts by weight and (B) comprises from about 1 to about 70 parts by weight.

Essential to the present invention are vinyl-based monomers capable of exhibiting flame retardant properties. Examples of monomers which provide flame resistant properties to the attached polymer stages include bromostyrene, dibromostyrene, chlorostyrene and dichlorostyrene. These flame retardant monomers may also be combined with other vinyl-based polymers. Preferred combinations of monomers which polymerize to form attached stage polymers containing monomers with flame retardant properties include styrene/bromostyrene, styrene/acrylonitrile/dibromostyrene, styrene/methylmethacrylate/brominated styrene, methylmethacrylate/brominated styrene, and interpolymers with acrylonitrile, methylmethacrylate as well as halogen containing alkyl acrylates and methacrylates.

The thermoplastic resin composition may also contain an effective amount of any suitable additives such as addition rubbers, polymers, fillers, pigments, dyes, antioxidants, stabilizers, ultraviolet light absorbers and mold release agents.

The reinforcing filler can be comprised of any organic or inorganic filler including but not limited to glass fiber, carbon fiber, Aramid fiber, metallic fiber, asbestos, whisker, glass beads, glass flakes, calcium carbonate, talc, mica, aluminum oxide, magnesium hydroxide, boron extrude, beryllium oxide, calcium silicate, clay or metal powder.

The compositions can also be further rendered more flame resistant with effective amounts, e.g., between about 1 and 30 parts by weight per 100 parts by weight of resin, of a flame retardant agent, component (D), other than component (B) above-described; suitable for use herein are, for example, elementary red phosphorous, phosphorous compounds, halogen compounds, nitrogen compounds, antimony oxide, metal salt(s) of sulfonated diphenylsulfone, metal salt(s) of trichlorobenzene sulfonic acid, mixtures thereof, and the like.

DESCRIPTION OF THE PREFERRED EMBODIMENTS

The following examples illustrate the present invention. They are not to be construed to limit the claims in any manner whatsoever. All parts given are by weight unless otherwise indicated. Impact strengths are reported as notched Izod according to ASTM D 25 at 23° C. unless otherwise specified; Charpy NI falling weight test is used to define ductile/brittle transition temperature (D/B).

The single slash is used between monomers of a single stage and a double slash or a hyphen is used as a shorthand method of indicating separation between stages. The first stage to be polymerized is written first before the double slash or hyphen, and subsequent stages are written subsequently.

EXAMPLE 1

I. Preparation of Silicone/Polystyrene-Bromostyrene/SAN (CSiM).

1st Stage-Octamethylcyclotetrasiloxane (90 parts), tetramethyltetravinylcyclotetrasiloxane (10 parts), tetraethoxysilane (1.7 parts), and gamma-methacryloxypropyltrimethoxysilane (1.43 parts) are mixed together. To the mixture is added a mixture of styrene (33.3 parts), divinylbenzene (0.67 parts), and azobisisobutyronitrile (0.25 parts). The organic mixture is then added to deionized water (400 parts) containing dodecylbenzenesulfonic acid (1.3 parts) dissolved. The final mixture is stirred and then emulsified by passing twice through a homogenizer under a pressure of 8400 to 8600 psi.

The emulsion is displaced into a separable flask equipped with a condenser, nitrogen inlet port and stirrer, and heated up to 90° C. while under a nitrogen blanket. The polymerization is continued for 4.5 hours and then quenched by neutralization and cooled down to room temperature. The yield of the polymer is 87 percent, the degree of the polymer swelling is 9.5, the gel content is 47.6 percent and the volume averaged particle size thereof is 246 nm as measured by a laser light scattering method.

2nd Stage—One stream containing a mixture of dibromostyrene (BrSt) (31.4 parts), styrene (S) (31.4 parts) and acrylonitrile (AN) (21 parts), which is calculated based on 30 parts BrSt/S/AN per 70 parts of dry silicone/polystyrene-rubber, and another stream containing an aqueous solution of 91 parts of deionized water, 0.24 parts of potassium persulfate and 0.9 part of sodium dodecylbenzene sulfonate are concurrently added over 2.5 hours to be graft polymerized. After the completion of the addition, the polymerization is continued for another 1.5 hours. The BrSt/S/AN polymerization yield is 96 percent. The graft polymer is isolated in a hot aqueous solution of MgSO$_4$, washed and dried at 75° C. until a constant weight is obtained.

II. Dry Blending

A dry blend of Lexan® 141, a poly(bisphenol-A) carbonate, CSiM flame retardant and other ingredients are tumble mixed on a jar shaker to give a homogeneous dispersion. The well mixed dry mixture is then extruded on a Werner Pfleiderer 30 mm twin screw extruder under the normal operation conditions for Lexan®. The dry, pelletized extrudate is then injection molded on a 75-ton Newbury molding machine into test specimens. The Izod bars are tested for impact strength as per ASTM Method D-256, for low temperature ductility using the Charpy notched impact test procedure and for flammability in accordance with Underwriters Laboratories Bulletin 94 procedures, VO being the highest rating.

COMPARATIVE EXAMPLES 1A*–1C*

For comparison purposes, straight Lexan® 141 (1A*) is tested as well as Lexan® 141 containing a potassium salt of a monosulfonated diphenylsulfone (KSS) (1B*). Thirdly, Lexan® 141 having a non-brominated graft (1C*), prepared as follows, is tested.

1st Stage—Same procedure as in Example 1 except using 100 parts of octamethylcyclotetrasiloxane and 0 parts of tetramethyltetravinylcyclotetrasiloxane. The silicone/polystyrene (Si/PS) substrate rubber yield is 84.3 percent and has a 53 percent gel content and a degree of swelling of 14.3. The rubber particle size is 265 nm in diameter (volume averaged).

2nd Stage—Based on the 70 weight percent of the dry substrate rubber content in 1st Stage latex, 30 parts of a S/AN (75/25%) mixture are grafted on in accordance with the procedures described above. Dry blending procedure is also in accordance with the procedure described above.

The compositional data and test results are set forth below in Table 1.

TABLE 1

| POLYCARBONATE BLENDS | | | | |
|---|---|---|---|---|
| EXAMPLE | 1A* | 1B* | 1C* | 1 |
| COMPOSITION | | | | |
| Lexan ® 141 | 100 | 100 | 90 | 90 |
| CSiM** | — | — | — | 10 |
| CSiM*** | — | — | 10 | — |
| KSS | — | 0.3 | — | — |
| PROPERTIES | | | | |
| UL, 0.125" Flame Out Time | HB | VO | HB/V2 | VO |
| max.,sec | 46 | 6.0 | 32 | 9.3 |
| avg.,sec | 22.5 | 2.8 | 13.5 | 2.8 |
| N.I. @ r.t. | | | | |
| 0.125" | 15.2 | 14.7 | 13.2 | 12.6 |
| 0.250" | 2.1 | 2.0 | 10.1 | 9.3 |
| Charpy NI, .125" | | | | |
| r.t. | — | — | — | 15.3 |
| 5° C. | — | 13.7 | — | — |
| 0 | — | 9.4 | — | 10.9 |
| −15 | — | 1.6 | — | 9.2 |
| −25 | — | 2.1 | — | 7.8 |
| −30 | — | — | — | — |
| −35 | 13 | 1.6 | — | 7.4 |
| −40 | — | — | — | — |
| −45 | — | — | — | 6.5 |
| −50 | — | — | — | — |
| −53 | — | — | — | 3.8 |
| D/B,°C. | — | −5 | — | −35 |

Lexan ® 141 = a poly(bisphenol-A carbonate)
CSiM** = organosiloxane/polystyrene-bromostyrene/styrene/acrylonitrile - Example 1
CSiM*** = organosiloxane/polystyrene-styrene/acrylonitrile
KSS = potassium salt of a monosulfonated diphenylsulfone
UL = Underwriters Laboratories, Bulletin 94
N.I. = notched Izod impact, ft-lbs/in
r.t. = room temperature
D/B = Ductile/brittle transition temperature
* = Comparative Examples As can be clearly seen from the above Table 1, the non-treated polycarbonate is highly flammable. Treating the polycarbonate with a conventional flame retardant, KSS, does succeed in imparting flame retardance in the polycarbonate but the composition does not exhibit low temperature ductility. Grafting with a non-brominated styrene does not substantially improve flame retardance. However, the polycarbonate blend containing the silicone-based brominated styrene graft exhibits both a substantial improvement in flame retardance, attaining the maximum rating, and exhibits excellent low temperature ductility.

EXAMPLES 2–10

The procedure of Example 1 is followed substituting various other thermoplastic resins for Lexan® 141. Poly(bis-(3,5-dimethyl-4-hydroxy phenol), poly (ethylene terephthalate), poly(1,4-butylene terephthalate), poly(ethylene glycol), polystyrene, poly(2,6-dimethyl-1,4-phenylene ether), polyoxymethylene, nylon-6,6, and poly(ethylene cyanide) are employed as the thermoplastic resin. Thermoplastic resin blends will be formed in accordance with the appended claims.

EXAMPLES 11-19

The procedure of Example 1 is followed except various vinyl-based polymers capable of exhibiting flame retardant properties are substituted for dibromostyrene. Chlorostyrene, dichlorostyrene, bromostyrene, interpolymers of dibromostyrene with acrylonitrile, methyl acrylate, chloromethyl methacrylate and a mixture of dibromostyrene and styrene are employed as vinyl-based polymers capable of exhibiting flame retardant properties. Thermoplastic resin blends will be formed in accordance with the appended claims.

EXAMPLE 20

The first stage production of the silicone/polystyrene rubber substrate is the same as described in Example 1. At the second stage, to the silicone/polystyrene latex is added one stream containing butyl acrylate, butylene glycol diacrylate, diallyl maleate, deionized water and sodium dodecylbenzenesulfonate concurrently with another aqueous stream consisting of a water-soluble initiator over a period of 1 to 3 hours at 75 C. The butyl acrylate/dry silicone-based rubber weight ratio is aimed at 35/35. The dibromostyrene/styrene/acrylonitrile terpolymer grafting procedure from Example 1 is repeated here and so are the isolation steps. A thermoplastic resin blend will be formed in accordance with the appended claims.

EXAMPLES 21-22

The procedure of Example 1 is repeated except various vinyl polymers are substituted for styrene in the first stage. Alkyl(meth)acrylate and diacrylate are employed as the vinyl polymer. Thermoplastic resin blends will be formed in accordance with the appended claims.

The above-mentioned patent applications and publications are incorporated herein by reference as are the Standard Test Methods.

Many variations of the present invention will suggest themselves to those skilled in this art in light of the above detailed description. For example the aromatic polycarbonate can be replaced in whole or in part with a polyester carbonate containing units derived from bisphenol A, phosgene and terephthaloyl chloride and/or isophthaloyl chloride. The aromatic polycarbonate can be replaced in whole or in part by a polycarbonate containing units of bis-(3,5-dimethyl-4-hydroxyphenyl)-sulfone, alone, or combined with bisphenol-A. The poly(ethylene terephthalate) can be replaced in whole or in part by poly(1,4-butylene terephthalate) or by a polyester derived from 1,4-cyclohexanedimethanol alone or combined with ethylene glycol and terephthalic acid and/or isophthalic acid. The polyester can be replaced in whole or in part by a styrene resin, such as polystyrene or an acrylonitrile/styrene/butadiene terpolymer, or by a styrene/maleic anhydride copolymer. The polyphenylene ether can be replaced in whole or in part by poly(2,6-dimethyl-co-2,3,6-trimethyl-1,4-phenylene ether). A poly(etherester) resin, poly(etherimide) or poly(etherimide ester) resin may also be employed. All such obvious modifications are within the full intended scope of the appended claims.

I claim:

1. A flame retardant multi-stage polyorganosiloxane-based qraft polymer composition comprising:
   (a) as a first stage, a substrate selected from
      (i) an organosiloxane polymer with units derived from a cross-linking agent or agents, and optionally units which serve as a graft linking agent or agents;
      (ii) a polymeric co-homopolymerized substrate comprised of, in combination, an organo-siloxane polymer and at least one vinyl-based polymer;
      (iii) a polymeric co-homopolymerized substrate comprised of, in combination, an organosiloxane polymer, at least one vinyl-based polymer, and units which are derived from a cross-linking agent or agents;
      (iv) a polymeric co-homopolymerized substrate comprised of, in combination, an organosiloxane polymer, at least one vinyl-based polymer, and units which serve as a graft-linking agent or agents;
      (v) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents;
      (vi) a polymeric co-homopolymerized substrate comprised of, in combination, an organosiloxane polymer, at least one vinyl-based polymer, and a mixture of any of units which are derived from a cross-linking agent or agents, units which serve as a graft-linking agent or agents, or units derived from a cross-linking agent or agents and units from the same or different agent or agents which serve as a graft-linking agent or agents; or
      (vii) a mixture of (i), and at least one of (ii), (iii), (iv), (v) or (vi); and a functionally effective amount of
   (b) at least one subsequent stage or stages graft polymerized in the pr previous stages, the outermost stage being comprised of a vinyl-based polymer, or a cross-linked vinyl-based polymer, capable of exhibiting flame retardant properties.

2. A composition as defined in claim 1 wherein said organo-substrate (a) (ii) comprises approximately 5 to 95 weight percent of the total graft copolymer composition based upon the weight of said first stage substrate and any subsequent graft stage or stages taken together.

3. A composition as defined in claim 2 wherein said first stage substrate (a) ii) comprises approximately 30 to 90 weight percent of the total graft polymer composition.

4. A composition as defined in claim 1 wherein said first stage substrate (a) (ii) is comprised of approximately 3 to 97 weight percent of organosiloxane polymer and correspondingly 97 to 3 weight percent of vinyl-based polymer.

5. A composition as defined in claim 4 wherein said first stage substrate (a) (ii) is comprised of approximately 5 to 45 weight percent of vinyl-based polymer.

6. A composition as defined in claim 1 wherein said organosiloxane polymer is comprised primarily of a mixture of units of the formula

wherein R is hydroxen or a monovalent hydrocarbon radical of about 1 to 16 carbon atoms and n is 0, 1 or 2.

7. A composition as defined in claim 1 wherein the vinyl-based polymer component of said first stage substrate (a) (ii) is comprised primarily of polymerized alkenyl aromatic units, (meth)acrylate units or a mixture thereof.

8. A composition as defined in claim 7 wherein said vinyl-based polymer component comprises polystyrene.

9. A composition as defined in claim 1 wherein the vinyl-based polymer in any subsequent stage (b) includes monomers selected from the group consisting of alkenyl aromatic compounds, (meth)acrylate compounds, vinyl cyanide compounds, maleimide compounds, acrylamide compounds or mixtures of any of the foregoing.

10. A composition as defined in claim 9 wherein said vinyl-based polymer comprises polymerized bromostyrene, dibromostyrene, chlorostyrene, dichlorostyrene, or a mixture of any of the foregoing.

11. A composition as defined in claim 9 wherein said vinyl-based polymer comprises polymerized dibromostyrene or a mixture thereof with styrene, styrene and acrylonitrile, styrene and methyl methacrylate, or methyl methacrylate.

12. A composition as defined in claim 1 wherein said subsequent stages (b) comprise
    (b)(i) a second stage comprising at least one polymer, and optionally units derived from a cross-linking agent or agents, units which serve as a graft-linking agent or agents, units derived from a cross-linking agent or agents and units from the same agent or agents which serve as a graft-linking agent or agents or a mixture of any of the foregoing; and
    (b)(ii) a third stage comprising at least one vinyl-based polymer, or cross-linked vinyl-based polymer, capable of exhibiting flame retardant properties which is the same as, or different than (b)(i).

13. A composition as defined in claim 12 wherein the ratio of first stage substrate polymer (a) to second stage polymer (b)(i) is 10:90 to 90:10 by weight based upon 100 parts by weight of (a) and (b)(i) combined; and the amount of third stage polymer (b)(ii) comprises from about 10 to about 90 parts by weight per 100 parts by weight of (a), (b)(i), and (b)(ii) combined.

14. A composition as defined in claim 12 wherein subsequent stage (b)(i) comprises a cross-linked butyl acrylate polymer and subsequent stage (b)(ii) comprises a dibromostyrene/styrene/acrylonitrile terpolymer.

15. A composition comprising
(A) A normally-flammable thermoplastic resin, and
(B) an effective flame retarding amount of a multi-stage polyorganosiloxane-based graft polymer composition comprising:
    (a) as a first stage, a substrate selected from
        (i) an organosiloxane polymer with units derived from a cross-linking agent or agents and optionally units which serve as a graft-linking agent or agents;
        (ii) a polymeric co-homopolymerized substrate comprised of, in combination, an organosiloxane polymer and at least one vinyl-based polymer;
        (iii) a polymeric co-homopolymerized substrate comprised of, in combination, an organosiloxane polymer, at least one vinyl-based polymer, and units which are derived from a cross-linking agent or agent;
        (iv) a polymeric co-homopolymerized substrate comprised of, in combination, an organosiloxane polymer, at least one vinyl-based polymer, and units which serve as a graft-linking agent or agents;
        (v) a polymeric co-homopolymerized substrate comprised of, in combination, an organosiloxane polymer, at least one vinyl-based polymer, units which are derived from a cross-linking agent or agents and units from the same or different agent or agents which serve as a graft-linking agent or agents;
        (vi) a polymeric co-homopolymerized substrate comprised of, in combination, an organosiloxane polymer, at least one vinyl-based polymer, and a mixture of any of units which are derived from a cross-linking agent or agents, units which serve as a graft-linking agent or agents, or units derived from a cross-linking agent or agents and units from the same or different agent or agents which serve as a graft-linking agent or agents; or
        (vii) a mixture of and at least one of (ii), (iii), (iv), (v) or (vi); and a functionally effective amount of
    (b) at least one subsequent stage or stages graft polymerized in the presence of any previous stages, the outermost stage being comprised of a vinyl-based polymer, or a cross-linked vinyl-based polymer, capable of exhibiting flame retardant properties.

16. A composition as defined in claim 15 wherein component (A) comprises from about 1 to about 99 parts by weight and component (B) comprises from about 99 to about 1 part by weight per 100 parts by weight of (A) and (B) together.

17. A composition as defined in claim 16 wherein component (A) comprises from about 99 to about 30 parts by weight and component (B) comprises from about 1 to about 70 parts by weight.

18. A composition as defined in claim 15 wherein said thermoplastic resin (A) comprises a polyvinylic resin, a polyester resin, a polyamide resin, a polycarbonate resin, a polyacetal resin, a polyether resin, a poly(etherester) resin, a poly(etherimide) resin, a poly(ethermide ester) resin, interpolymers comprising units of any of the foregoing resins, and blends of any of the foregoing resins, interpolymers or combinations thereof.

19. A composition as defined in claim 18 wherein said thermoplastic resin (A) comprises a polycarbonate resin.

20. A composition as defined in claim 15 wherein said first stage substrate (a) (i) or (a) (ii) comprises approximately from 3 to 97 weight percent of the total graft polymer composition based upon the weight of said first stage and any subsequent graft stages taken together.

21. A composition as defined in claim 20 wherein said first stage substrate (a)(i) or (a)(ii) comprises approximately 30 to 90 weight percent of the total graft polymer composition.

22. A composition as defined in claim 15 wherein said first stage substrate (a)(ii) is comprised of approximately 3 to 97 weight percent of organosiloxane polymer and correspondingly about 97 to 3 weight percent of vinyl-based polymer.

23. A composition as defined in claim 22 wherein said first stage substrate (a)(ii) is comprised of approximately 5 to 45 weight percent vinyl-based polymer.

24. A composition as defined in claim 15 wherein said organosiloxane polymer is comprised primarily of a mixture of units of the formula $$R_nSiO_{(4-n)/2}$$

wherein R is hydrogen or a monovalent hydrocarbon radical of about 1 to 16 carbon atoms and n is 0, 1 or 2.

25. A composition as defined in claim 15 wherein said vinyl-based polymer component of said first stage (a)(ii) is comprised primarily of polymerized alkenyl aromatic units, (meth)acrylate units or a mixture thereof.

26. A composition as defined in claim 25 wherein said vinyl-based polymer component comprises polystyrene.

27. A composition as defined in claim 15 wherein said vinyl-based polymer in any subsequent stage (b) includes monomers selected from the group consisting of polymerized alkenyl aromatic compounds, (meth)acrylate compounds, vinyl cyanide compounds, maleimide compounds and acrylamide compounds.

28. A composition as defined in claim 27 wherein said vinyl-based polymer comprises polymerized bromostyrene, dibromostyrene, chlorostyrene, dichlorostyrene, or a mixture of any of the foregoing.

29. A composition as defined in claim 28 wherein said vinyl polymer comprises polymerized dibromostyene, or a mixture thereof with styrene, styrene and acrylonitrile, styrene and methyl methacrylate, or methyl methacrylate.

30. A composition as defined in claim 15 wherein in component B said subsequent stages (b) comprise
 (b)(i) a second stage comprising at least one said vinyl-based polymer and optionally units derived from at least one cross-linking agent or agents, units which serve as a graft-linking agent or agents, units derived from at least one cross-linking agent or agents and graft-linking agent or agents or a mixture of any of the foregoing; and
 (b)(ii) a third stage comprising at least one vinyl-based polymer, or cross-linked vinyl-based polymer, capable of exhibiting flame retardant properties, which is the same as, or different than (b)(i).

31. A composition as defined in claim 30 wherein the ratio of substrate polymer (a) to second stage polymer (b)(i) is 10:90 to 90:10 by weight based upon 100 parts by weight of (a) and (b)(i) combined and the amount of third stage polymer (b)(ii) comprises from about 10 to about 90 parts by weight per 100 parts by weight of (a), (b)(i), and (b)(ii) combined.

32. A composition as defined iu claim 30 wherein subsequent stage (b)(i) comprises a cross-linked butyl acrylate polymer and subsequent stage (b)(ii) comprises a dibromostyrene/styrene/acrylonitrile terpolymer.

33. A composition as defined in claim 15 which also includes
 (C) an effective amount of a reinforcing filler.

34. A composition as defined in claim 30 which also includes
 (C) an effective amount of a reinforcing filler.

35. A composition as defined in claim 15 which also includes
 (D) an effective amount of at least one additional flame retardant agent which may be the same as or different than (B).

36. A composition as defined in claim 30 which also includes
 (D) an effective amount of at least one additional flame retardant agent which may be the same as or different than (B).

37. A composition as defined in claim 15 which also includes
 (C) an effective amount of a reinforcing filler; and
 (D) an effective amount of at least one additional flame retardant agent which may be the same as or different than (B).

38. A composition as defined in claim 30 which also includes
 (C) an effective amount of a reinforcing filler, and
 (D) an effective amount of at least one additional flame retardant agent which may be the same as or different than (B).

39. An article molded from a composition as defined in claim 15.

40. An article molded from a composition as defined in claim 30.

41. An article extruded from a composition as defined in claim 15.

42. An article extruded from a composition as defined in claim 30.

43. An article thermoformed from a composition as defined in claim 15.

44. An article thermoformed from a composition as defined in claim 30.

* * * * *